United States Patent [19]

Miyake

[11] 3,818,291

[45] June 18, 1974

[54] OPERATING SYSTEM FOR ELECTRICALLY DRIVEN VEHICLES

[75] Inventor: Hiroyuki Miyake, Tokyo, Japan

[73] Assignee: Kabushiki Kaisha Meidensha, Tokyo, Japan

[22] Filed: Nov. 9, 1972

[21] Appl. No.: 305,162

Related U.S. Application Data

[63] Continuation-in-part of Ser. No. 119,742, March 1, 1971, abandoned.

[30] Foreign Application Priority Data

Mar. 9, 1970  Japan................................ 45-19891
Mar. 9, 1970  Japan................................ 45-19894

[52] U.S. Cl. ................................. 318/139, 318/341
[51] Int. Cl. ............................................... H02p 5/16
[58] Field of Search ........................... 318/139, 341

[56] References Cited
UNITED STATES PATENTS

| | | | |
|---|---|---|---|
| 3,349,309 | 10/1967 | Dannettell | 318/139 |
| 3,517,290 | 6/1970 | Gynsser | 318/139 |
| 3,529,230 | 9/1970 | Tedd | 318/139 |
| 3,551,774 | 12/1970 | Rusch | 318/139 |
| 3,686,549 | 8/1972 | Winebrenner | 318/139 |

*Primary Examiner*—Robert K. Schaeffer
*Assistant Examiner*—Thomas Langer
*Attorney, Agent, or Firm*—Hans Berman; Kurt Kelman

[57] ABSTRACT

An operating system for an electrically driven vehicle, for example a fork-lift truck, of the type that has an electric motor connected to a DC source via a chopper circuit. The system includes a thyristor serially connected in the control circuit for said system and a transistorized detector circuit which senses the normal operation of the chopper circuit, the accelerator pedal transducer and the accelerator switch, and makes the thyristors non-conductive in the event of malfunctioning.

7 Claims, 7 Drawing Figures

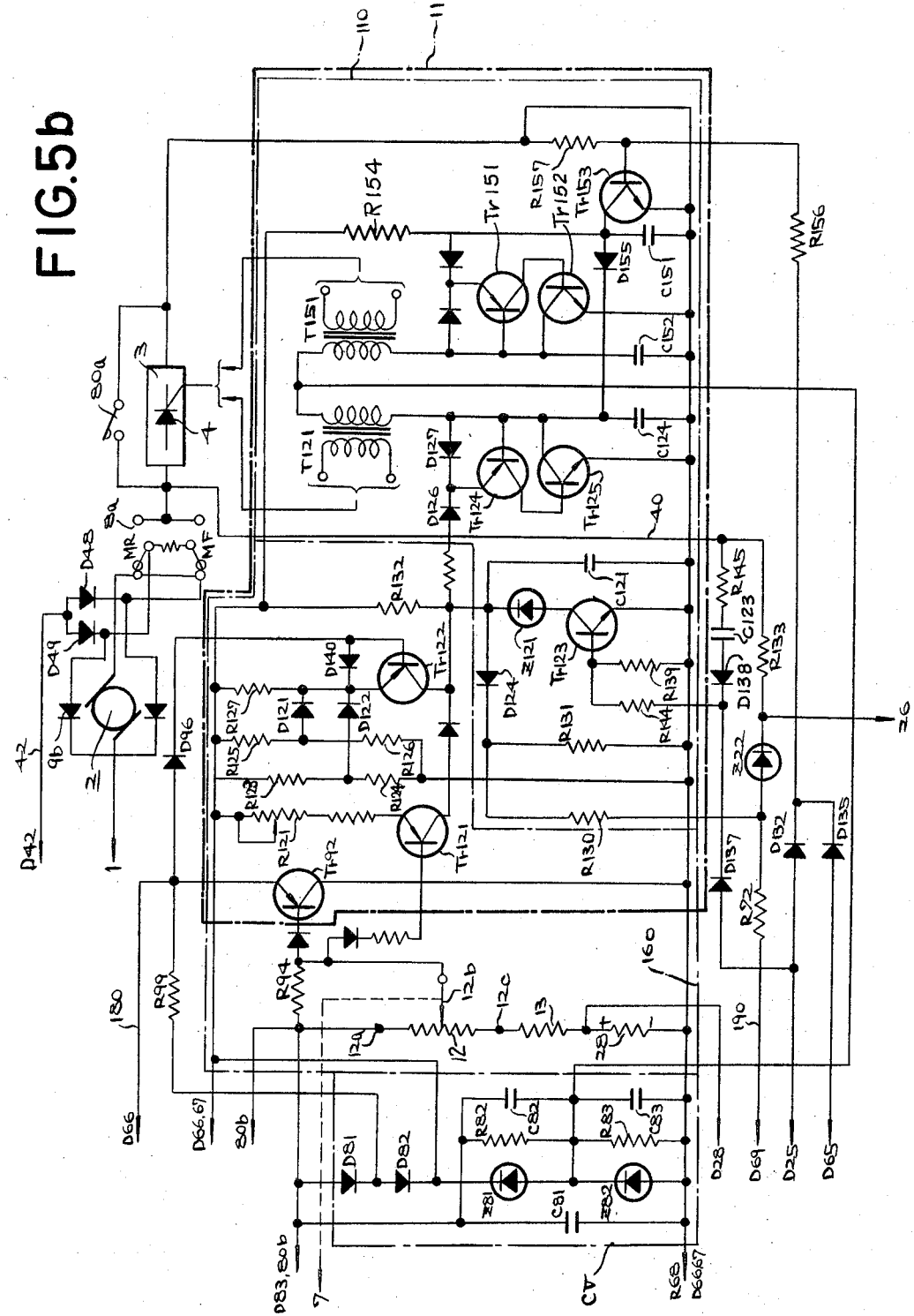

3,818,291

OPERATING SYSTEM FOR ELECTRICALLY DRIVEN VEHICLES

CROSS REFERENCE TO RELATED APPLICATION

This application is a continuation-in-part of my copending application, Ser. No. 119,742, filed Mar. 1, 1971, and now abandoned.

BACKGROUND OF THE INVENTION

1. Field of the Invention

This invention relates to electrically driven vehicles of the type which includes DC power source and an electric motor. More particularly, this invention relates to an operating system for such vehicles.

2. Discussion of the Prior Art

In prior art electrically driven vehicles, power is supplied from a DC power carried by the vehicle to the electric motor associated with the transmission system by means of a chopper circuit. The chopper basically functions as a voltage regulator and permits the operator to exercise a continuously variable degree of control over the speed of the motor and, hence, of the vehicle. In such prior art arrangements, when the voltage applied to the electric motor attains some predetermined value, which is close to the voltage of the DC source, the contacts of a relay close, thereby supplying the full voltage of the DC source to the motor. See, for example, U.S. Pat. No. 3,562,617, which issued on Feb. 9, 1971, to Roger D. Meier. In vehicles of this type, the voltage across the electric motor at the time of starting is extremely low, typically of its rated value and, for example, when the chopper circuit is controlled by the depression of the vehicle's accelerator pedal, the period of conduction of the thyristor in the chopper circuit is extremely short in the period following the initial depression of the accelerator. Accordingly, if the chopper circuit per se is functioning normally, but the chopper control circuit is defective, the vehicle will start abruptly, at full speed, with a consequent risk of grave injury to the operator and to any nearby pedestrians.

SUMMARY OF THE INVENTION

The primary object of this invention is to provide an operating system for an electrically driven vehicle which improves the safety of the vehicle.

This, and other objects, are attained by a first embodiment of the invention which comprises an operating system for an electrically driven vehicle of the type wherein power is fed from a DC source to an electric motor, via a chopper circuit. The system comprises a relay for applying the DC source to the motor; and switching means, serially connected with the armature winding of the relay, the series circuit so formed being connected in parallel with the DC source, the switching means including an accelerator switch coupled to the accelerator pedal of said vehicle. The system further includes a variable-resistance transducer coupled to the accelerator pedal; and a signal generator, controlled by the variable-resistance transducer, for generating a gating signal for the chopper circuit, in accordance with the instantaneous position of the accelerator pedal.

The system also includes a control circuit having two inputs and an output, the output being connected to the switching means to render the same conductive if the signals present on the inputs indicate normal operation of the chopper circuit and the variable-resistance transducer, and an auxiliary resistor connected between the variable-resistance transducer and one side of the DC source, the voltage which is developed across the auxiliary resistor being connected to one of the inputs of the control circuit, the other input thereof being connected to that side of the chopper circuit which connects to the motor, thence to the other side of said DC source.

The exact nature of this invention and its mode of operation will become apparent from the following description of preferred embodiments, when considered in connection with the appended drawing.

BRIEF DESCRIPTION OF THE DRAWING

FIGS. 5A and 5B jointly are a schematic drawing of another embodiment of the invention which combines many of the features of the embodiments shown in FIGS. 3 and 4;

DETAILED DESCRIPTION OF THE INVENTION

Figure 1:
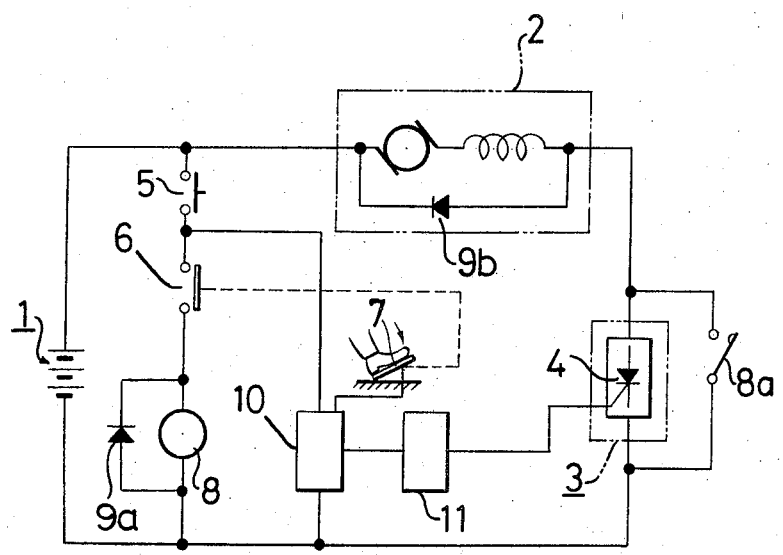
FIG. 1 is a partially diagramatic, partially schematic drawing of a typical prior art control circuit for an electrically driven vehicle.

As shown in FIG. 1, a typical prior art arrangement comprises a DC power source 1 whose positive terminal is connected to the drive motor 2 of the vehicle, and whose negative terminal is connected to a chopper circuit 3, including a main thyristor 4, which is connected in series with the motor 2. Another series circuit connecting to the DC source comprises an ignition switch 5, an accelerating switch 6, and the control winding of a relay 8. The switch 6 is closed when the accelerator pedal 7 of the vehicle is fully depressed by the operator. The contacts 8a of relay 8 provide a shunt across the chopper circuit 3 when closed by the energized relay 8.

Flywheel diodes 9a, 9b are connected in parallel with relay 8 and motor 2, respectively, for smoothing the current flow therethrough. A transducer 10 converts the position of the accelerating pedal 7 into an electrical signal proportional to the pedal depression, which signal is applied to the input circuit of a signal generator 11 which produces a gating signal for thyristor 4, in response to the value of the signal from the transducer, and thus to the pedal position.

The prior art system operates as follows:

When switch 5 is closed, and pedal 7 depressed by the operator, a gating signal supplied by signal generator 11 to thyristor 4, in response to the position of pedal 7, causes the chopper circuit 3 to provide current from DC source 1 to motor 2 at a voltage proportional to the pedal position. When the pedal is almost fully depressed and the voltage applied to the motor approaches the full voltage of the DC source, the switch 6 is closed by the pedal and the chopper circuit 3 is short-circuited by the closing contacts 8a of relay 8. The full voltage of DC source 1 is thus impressed on motor 2, and the vehicle travels at its maximum speed. In the event of a failure in pedal 7, transducer 10, or chopper circuit 3, the full voltage of the DC source 1 is impressed on motor 2 before the speed of the latter has been built up by chopper circuit 3, if the operator does not promptly notice the breakdown and continues to depress pedal 7, thereby causing hazardous operation of the vehicle.

Figure 2:
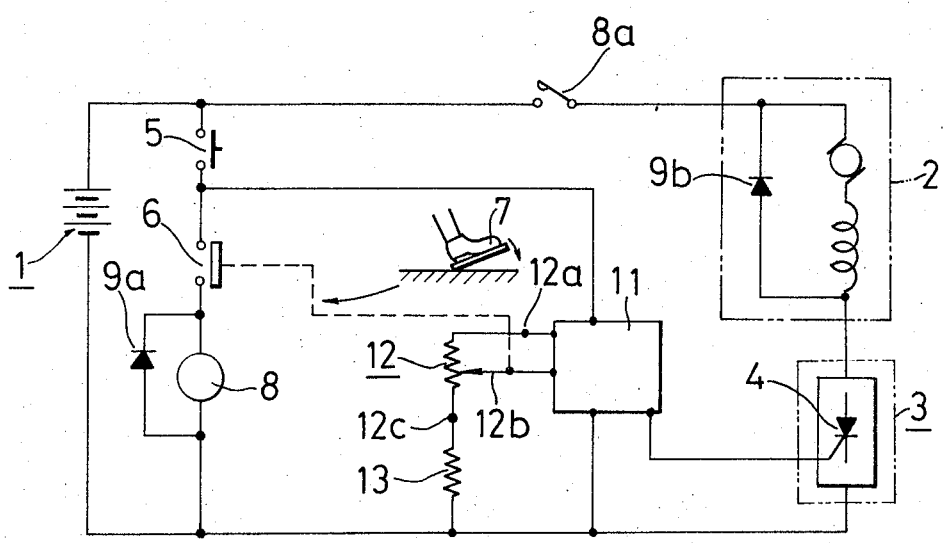
FIG. 2 is a partially diagramatic, partially schematic drawing of a second prior art control circuit.

In the otherwise identical system shown in FIG. 2, a variable resistor 12 replaces the transducer 10. Its sliding contact 12b is moved by the pedal 7. One of its stationary terminals 12a is connected to the signal generator 11 and the other stationary terminal 12c to the negative terminal of the DC source 1 through an auxiliary resistor 13. The contacts 8a of relay 8 are arranged between the motor 2 and the positive terminal of the DC source 1.

When ignition switch 5 is closed, the voltage of DC power source 1 is supplied to signal generator 11. When the accelerator pedal 7 is depressed by the foot of the operator, the sliding contact 12b of variable resistor 12 is shifted towards terminal 12c while switch 6 is closed and relay 8 is energized, whereby the voltage of DC source 1 is supplied to motor 2 by chopper circuit 3. As sliding contact 12b moves towards terminal 12c, the speed of the vehicle is increased. If the continuity of variable resistor 12 is accidentally interrupted, and the operator of the vehicle continues to depress the accelerating pedal without noticing the breakdown, the conduction angle of chopper circuit 3 reaches its maximum value (the condition which normally corresponds to the maximum speed of the vehicle), and the contacts 8a start the vehicle abruptly, at its maximum speed, which is highly dangerous.

In the present invention, the foregoing problems are eliminated, and three illustrative embodiments will be described in conjunction with the drawing.

The circuit of the invention shown in FIG. 3 includes all elements of the circuit of FIG. 1, connected in the same manner, except as will be described hereinbelow.

A switch element, for example, a thyristor 15, is connected in series with relay 8 and the negative terminal of the DC power source, and a detector circuit 16 is connected in parallel with the thyristor 15 and relay 8. An output signal is transmitted from detector circuit 16 to make the thyristor 15 conductive only if (a) a signal on input lead 17 of detector circuit 16 indicates that pedal 7 is in the proper position for closing contacts 8a, (b) a signal on input lead 18 confirms that an electrical signal proportional to the postiion of pedal 7 is furnished by transducer 10, and (c) an input signal on input lead 19 indicates that the voltate of chopper circuit 3 is below a safe limit. If accelerator pedal 7, transducer 10, or chopper circuit 3 malfunctions, and appropriate input signals are not received over each of th leads 17, 18, 19, when the accelerator pedal 7 is depressed by the operator, relay 8 is not energized, thus contacts 8a remain open, and motor 2 cannot be started.

The circuit of the second illustrative embodiment of the invention, shown in FIG. 4, includes all elements of the circuit of FIG. 2, connected in the same manner, except as will be described hereinbelow, as well as the afore-mentioned thyristor 15 interposed between relay 8 and the negative terminal of DC source 1.

Figure 3:
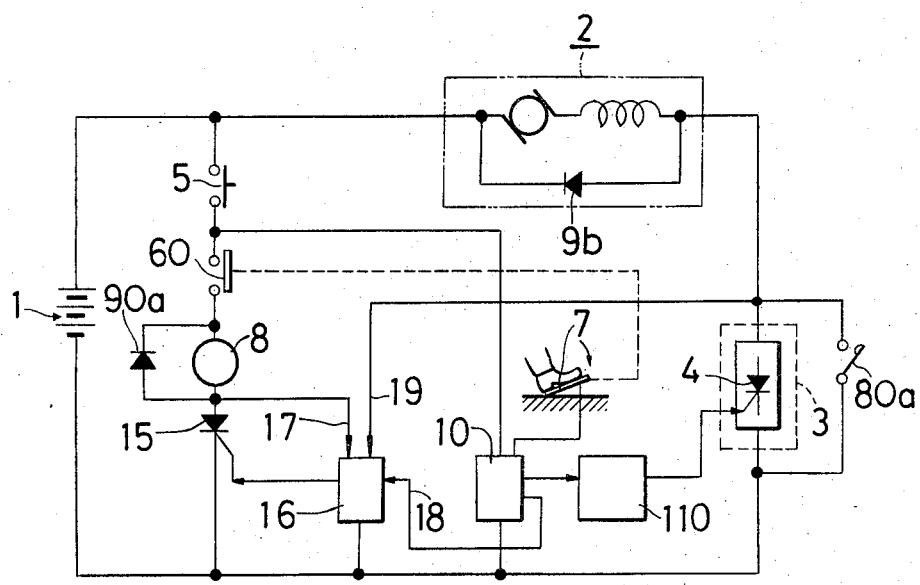
FIG. 3 is a partially diagramatic, partially schematic drawing of a first embodiment of the invention which avoids the deficiencies of the prior art circuits shown in FIGS. 1 and 2.

In this embodiment, the detector circuit 16 of FIG. 3 is replaced by a detector circuit 16a which includes a resistor 20 connected between the anode of thyristor 15 and one terminal of an ignition capacitor 21 whose other terminal is connected to the cathode of the thyristor. A Zener diode 23, as a voltage detecting element, connects the juncture 22 of the resistor 20 and capacitor 21 to the gating electrode of thyristor 15. The juncture 22 is also connected to the emitter 24e of a transistor 24 whose collector 24c is connected to the negative terminal of the source 1. The transistor base 24b is connected to the anodes of two diodes 25, 26. A second auxiliary resistor 28 is interposed between the first-mentioned auxiliary resistor 13 and the negative terminal of DC source 1, and the juncture 29 of the two resistors is connected to the cathode of diode 26. The juncture 27 of motor 2 and chopper circuit 3 is connected to the cathode of diode 25. A third auxiliary resistor 30 is arranged between sliding contact 12b and stationary terminal 12a of variable resistor 12 in the signal generator 11.

A serially-connected silicon-controlled rectifier 41 and a resistor 42 are connected in parallel with thyristor 15. A capacitor 43 is connected between juncture of resistor 42 and SCR 41 and the anode of thyristor 15. A conventional gate control circuit 44 is connected, by a lead 46, to the control electrode of SCR 41 and, via a lead 47, to the anode side of chopper circuit 3.

The circuit of FIG. 4 operates as follows:

After the switches 5 and 6 are closed while transistor 24 is non-conductive, an electric charge is accumulated in the capacitor 21. When the potential across capacitor 21 exceeds the breakdown voltage of Zener diode 23, current flows into the gate of thyristor 15, the thyristor becomes conductive, which, in turn, causes contacts 8a to be closed to energize motor 2.

If transistor 24 is initially conductive, the voltage dividing ratio of resistor 20 and relay 8 becomes $$R_1/R_1 + r \, V_1 : R/R_1 + r \, V_1,$$

$V_1$ being the voltage of DC source 1, $r$ being the resistance of relay 8, and $R_1$ being the resistance of resistor 20 which is very much greater than $r$. The voltage $R/R_1 + r \, V_1$ which is impressed upon relay 8 is extremely small, and, thus, contacts 8a will not close.

also, in this case, the potential developed across capacitor 21 is chosen to be less than the breakdown voltage of Zener diode 23, whereby the thyristor 15 cannot become conductive.

If both terminals 27 and 31 of chopper circuit 3 are connected by an internal short circuit (due, for example, to a breakdown in main thyristor 4), a circuit is formed in which the current flows from power source 1, through the switches 5 and 6, relay 8, resistor 20, emitter 24e and base 24b of transistor 24, diode 25, chopper circuit 3, back to power source 1, whereby transistor 24 becomes conductive and thyristor 15 will be non-conductive.

Figure 4:
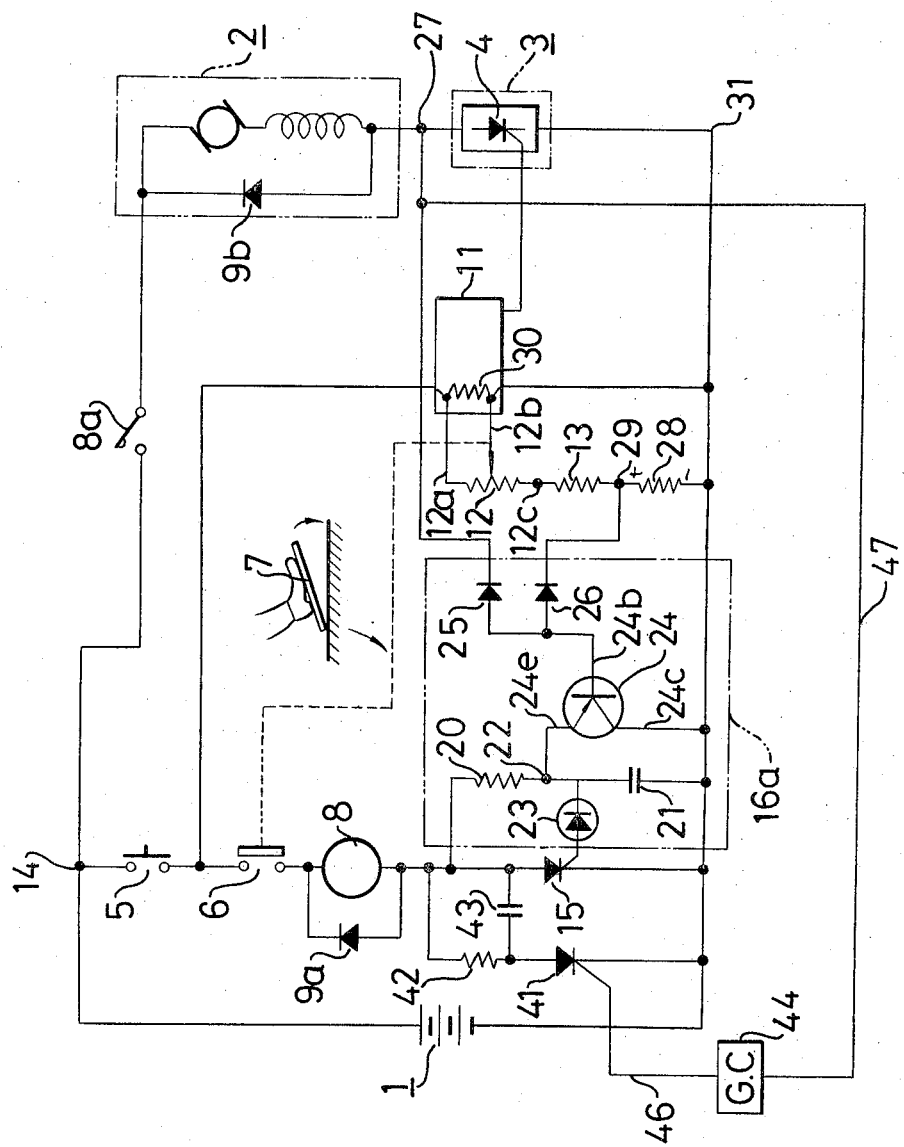
FIG. 4 is a partially diagramatic, partially schematic drawing of a second embodiment of the invention.

The terminal of the resistor 28 (at the juncture 29) is normally more positive than the other terminal, as indicated in FIG. 4. If this potential difference does not appear, due to a discontinuity in resistor 12 in the vicinity of terminal 12c, a circuit is formed in which current flows from power source 1, through switches 5 and 6, relay 8, resistor 20, the emitter 24e and base 24b of transistor 24, diode and the second auxiliary resistor 28, returning to the power source 1, whereby transistor 24 remains conductive and thyristor 15 is held nonconductive.

If a discontinuity occurs in resistor 12, near contact 12b, a potential approximately equal to that appearing on terminal 12a is obtained at the contact point of sliding contact 12b, and abnormal operation of chopper circuit 3 cannot occur.

To guard against a discontinuity in the vicinity of terminal 12a, it is sufficient if a resistance value for third auxiliary resistor 30 is selected which makes the voltage produced at the second auxiliary resistor 28 lower than the breakdown voltage of Zener diode 23. If the total resistance of variable resistor 12 is R, the resistance of resistor 13 is $R_1$, the resistance of resistor 28 is $R_2$, and the resistance of resistor 30 is $R_3$, then the voltage impressed on resistor 28, in the event of a discontinuity in resistor 12, is $$R_1/R_1 + R_2 + R_3 \times V_1, \text{ and if}$$

the resistance R of variable resistor is greater than the resistance $R_3$ of resistor 30, thyristor 15 cannot accidentally become conductive.

As will be obvious from the foregoing, a breakdown of the chopper circuit and/or a discontinuity in variable resistor 12 can be detected safely at the time the breakdown occurs and thyristor 15 inhibited from firing, thereby preventing contacts 8a from supplying power to motor 2.

Because of the use of semiconductor elements, such as transistors 24, Zener diode 23 and diodes 25 and 26, there is no time delay, and detection of malfunctions if facilitated.

It is, of course, entirely possible for a fault to develop in chopper circuit 3, variable resistor 12, etc., after thyristor 15 has fired. In that event, if the operator quickly released the accelerator pedal, switch 6 would open, releasing relay 8 and, hence, removing power from chopper 3 and motor 2. On the other hand, as a safety measure, in the circuit as actually built, a circuit is connected across thyristor 15 to extinguish the same in the event of a fault occurring after Thyristor 15 had been fired. This circuit comprises the silicon thyristor 15 had been fired. This circuit comprises the silicon-controlled rectifier 41 whose gate is connected, via gating control circuit 44, to juncture 27 of the chopper circuit 3. Silicon-controlled rectifier 41 provides, when fired, a discharge path for capacitor 43 so that, if a fault develops in chopper circuit 3, after thyristor 15 has fired, the large negative-going surge when capacitor 43 discharges extinguishes thyristor 15. Capacitor 43, of course, charges through resistor 42, relay 8, etc. during the time that thyristor 15 is conducting (i.e., during normal operation of the circuit).

On the other hand, any fault which might occur in resistor 12, for example in slider 12b, would remove the voltage from the input to signal generator 11. Thus, the output frequency of generator 11 would drop to zero, thereby preventing chopper 3 from firing.

Figure 5A:
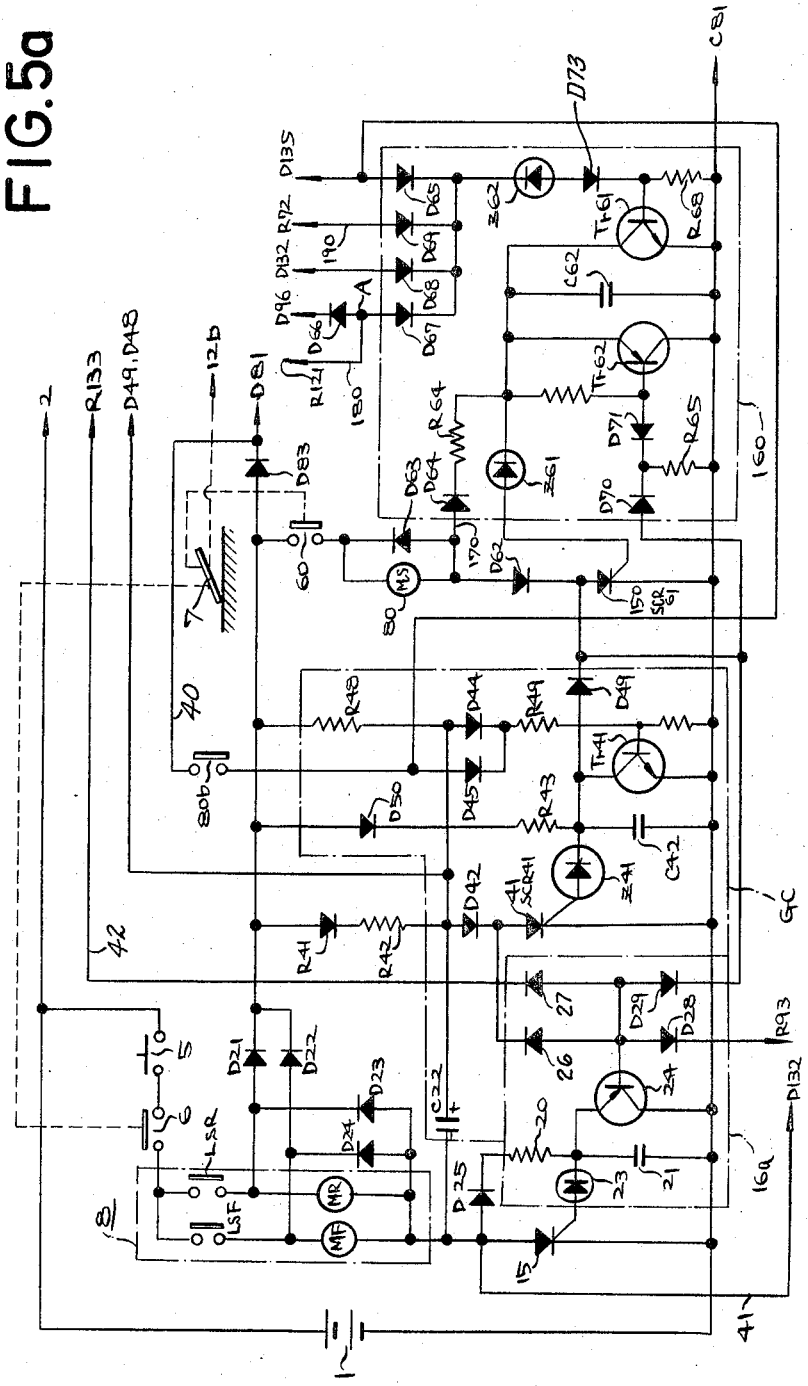

FIG. 5 depicts yet another embodiment of the invention which comprises many features of the circuit for starting the vehicle shown in FIG. 3 and many features of the circuit for applying full battery voltage to the drive motor shown in FIG. 4.

In this embodiment, the relay 8 comprises a pair of manual switches LSF, LSR and a pair of relays MF, MR which are controlled thereby. The automatic braking circuit consists of a capacitor C22, a transistor Tr41 and a thyristor SCR41, connected as shown.

The circuit of FIG. 5 operates as follows:

The vehicle can be operated by closing ignition switch 5, accelerating switch 6, and relay 8, etc., and successively, the forward-reverse main contactor MF (or MR).

It must be borne in mind that the main contactor must not be closed if either the chopper circuit 3 or one of the logic circuits is out of order. If main contactor MF (or MR) is closed with thyristor 4 of chopper circuit 3 left short-circuited and by-pass contact 80a (the contact which applies full voltage to drive motor 2) welded, together, drive motor 2 will run at full speed from the very beginning without any relation to the position of the accelerator, thus making operation of the vehicle very dangerous, as previously discussed. Therefore, when starting the vehicle, chopper circuit 3 and the logic circuit are checked first, and then main contactor 8a (MF or MR) is closed. Thyristor 15 must, of course, be turned on when closing the main contactor 8a. The gate signal for thyristor 15 is provided by a checking circuit 16a which checks whether or not the main contactor 8a is ready for closure. Checking circuit 16a comprises a transistor 24, a Zener diode 23, a resistor 20, a capacitor 21 and diodes 25, 26 and diodes D28, D29, connected as shown in FIG. 5.

Thyristor 15 cannot turn on, and thus the main contactor cannot be closed, if the chopper circuit of the logic circuit are out of order, that is to say if:

1 The automatic braking thyristor SCR41, whose anode is connected to the cathode of a diode 26, is initially short-circuited due to an internal malfunction;

2 the by-pass contacs 80a have become welded or thyristor 4 of chopper circuit 3 has been destroyed (i.e., short-circuited), causing the cathode of diode 26 to be connected to the negative terminal of the DC power source 1 through a resistor R133;

3 the constant-voltage power circuit malfunctions or there is a discontinuity in variable resistor 12, causing the cathode of diode D28 to be connected to the collector of transistor 24, through auxiliary resistor 28; or 4 the thyristor 150, whose anode is connected to the cathode of diode D29, is open or short-circuited.

On the other hand, if chopper circuit 3 and the logic circuit are working satisfactorily, capacitor 21 will begin to charge through diode D25 and resistor 20 when voltage is applied to the anode of thyristor 15 and transistor 24 is turned off. When the charging voltage equals the breakdown voltage of Zener diode 23, gate current will be supplied to the gate of thyristor 15 which thereby turns on, thus causing the main contactor 8a (for starting the vehicle) to close.

The firing delay of thyristor 15 is determined by time constant of resistor 20 and capacitor 21.

If there is a fault in the control unit while the vehicle is running at a minimum speed, the operator will lose control ability and the vehicle will run, abruptly, at full speed. Therefore, it is necessary to provide an automatic braking circuit G C which causes thyristor 15 to turn off and switches off chopper circuit 3 to automatically stop the vehicle. (However, automatic braking circuit G C must not function when by-pass contactor 80a is closed, since the vehicle is running at full speed at that time.) Chopper circuit 3 can be switched off by opening the main contactor 8a. This can be done by turning off thyristor 15. Thus, the automatic braking circuit G C is used to turn off thyristor 15 by automatically detecting malfunctions in chopper circuit 3.

Figure 6:
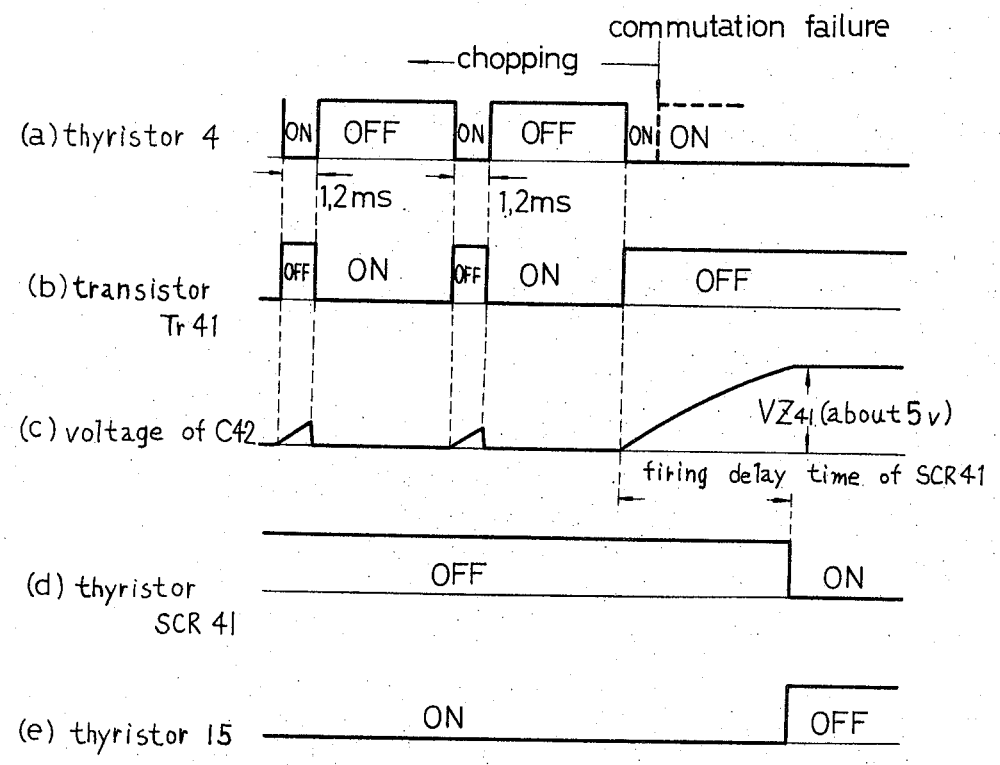
FIG. 6 depicts the electrical waveforms to be observed at various locations in the circuitry of FIG. 5.

Chopper circuit 3 is of the constant on-time type. Therefore, trouble in this circuit can be detected by checking whether the on-time is prolonged abnormally. In the middle of a chopping cycle, transistor Tr41 will turn on if thyristor 4 is on. On the other hand, transistor Tr41 will turn on if thyristor 4 is off. During the off-phase of thyristor 4, base current is supplied to transistor Tr41 through resistor R49, and thus Tr41 is turned on. If thyristor 4 remains turned on, transistor Tr41 will turn off since the base current therefore is by-passed through diode D48 (or D49), main contactor 8a (MF or MR), and thyristor 4. On the other hand, if Tr41 is turned off, capacitor C42 is charged through diode D50 and resistor R43. When the charging voltage across C42 attains the breakdown voltage of Zener diode Z41, thyristor SCR41 is turned on (as shown in FIG. 6 c and d).

The firing delay of SCR41 (from TR41's turn-off to SCR41's turn on) is determined by the time-constant of resistor R43 and capacitor C42, and consequently SCR41 will be turned on if the off-time of Tr41 (actually the on-time of thyristor 4) exceeds the firing delay of SCR41. Thus, SCR41 is turned on after the occurrence of commutation failure (that is when thyristor 4 cannot be turned off and remains on during chopping).

If SCR41 is turned on, thyristor 15 (which is at this point conducting) will be turned off by the electric charge on capacitor C22 which has the polarity shown in FIG. 5. The main contactor 8a (MF or MR) is then opened and chopper circuit 3 switched off. In this case, SCR41 remains turned on and, so, the gate current of thyristor 15 is by-passed by transistor 24. Therefore, transistor 24 cannot turn on again. In order to re-start the vehicle, the acceleration pedal 7 must be released to make SCR41 turn off.

If the by-pass contacts 80a are closed, the circuit operation would be as if thyristor 4 were turned on continuously. Accordingly, since the automatic braking circuit GC must not operate at this time, base current is supplied to transistor Tr41 from constant voltage power circuit CV through lead 40, contact 80b, diode D45 and resistor R49, when relay 80 is energized and contact 80b is closed. Therefore, transistor Tr41 can remain on to thereby prevent operation of the automatic braking circuit GC.

If by-pass contacts 80a are closed, full voltage will be applied to drive motor 2 and the vehicle will again move at maximum speed. Therefore, closure of by-pass contacts 80a while the vehicle is stopped or moving at slot speed may create a dangerous condition. Checking circuit 160 (the by-pass contactor circuit) must be carefully designed since it plays an important part in smooth operation of the vehicle. It must not be closed until accelerating pedal 7 has been depressed sufficiently or while the vehicle is running at a low speed.

Checking circuit 160 can be divided into two sections, (1) a monitor circuit for judging the MS closure and (2) a delay circuit.

Relay 80 must be closed under the following four conditions:

1 The accelerating pedal is depressed sufficiently (i.e., more than 80–90 percent of its maximum travel).

2 Variable resistor 12, which is interlocked with the accelerating pedal, is functioning properly.

3 Main conductor 8a is closed.

4 The conduction ratio in the chopper circuit has reached a specified level.

To close by-pass contact 80a, accelerating pedal switch 60 must be closed and thyristor SCR 61 must be fired. Accelerating switch 60 is mechanically constructed so that it cannot be closed unless the accelerating pedal is depressed through more than 80–90 percent of the total depressing angle.

The gate circuit of thyristor SCR61 is connected with a monitor circuit comprising a transistor Tr61, and diodes D67-D69, as shown. If any of the above-mentioned circuit conditions are not established, Tr61 will be short-circuited and SCR61 cannot turn on. Namely, relay 80 cannot be energized and contact 80b of relay 80 cannot close.

Operation of variable resistor 12 is checked in the following way. The sliding contact 12b of variable resistor 12 moves from terminal 12a to terminal 12b as the accelerating pedal is depressed, and its terminal varies accordingly. Therefore, the emitter voltage of transistor Tr92 changes in much the same way as the potential on contact 12b. If accelerating pedal 7 is not depressed so far and, thus, resistor 12 does not rotate as much, the potential at junction A (the anode of diode D67) is higher than the breakdown voltage of Zener diode Z62 and current will flow through diode D67, Zener diode Z62, diode D73, and the base and emitter of transistor T61. Therefore, Tr61 is short-circuited and thyristor SCR61 will not turn on. If the accelerating pedal is depressed further, and variable resistor 12 rotates further, the emitter potential of transistor Tr92 will be lowered and simultaneously the potential at junction A will also be lowered. If this potential falls to just below the breakdown voltage of Zener diode Z62, Tr61 will be turned off and thus SCR61 can be turned on. In like manner, SCR61 is not turned on unless variable resistor 12 operates correctly and the emitter voltage of transistor TR92 is lowered below the predetermined level. Therefore, closure of by-pass contacts 80a is prevented, even when mechanical trouble occurs such as when accelerating pedal 7 is depressed but variable resistor 12 does not rotate at all.

The by-pass contacts 80a will close as a matter of course after main contact 8a is closed and the chopper circuit has been advanced. In normal accelerator operation, accelerating switch 6 is closed to actuate relay 8, and relay 80 is energized and contact 80b of relay 80 closed, after switch 60 has been closed, by depressing accelerating pedal 7 further. Accordingly, there is no special problem in case of fault. However, energization of relay 80 must be preceded by energization of relay 8, even when the vehicle is started.

Consequently, the circuit of FIG. 5 is designed so that thyristor SCR61 cannot turn on before the thyristor 15 does. If thyristor 15 is turned off, base current will be supplied from the anode of thyristor 15 to transistor Tr61 through lead 41, across diode D68, Zener diode Z62 and diode D73. Thus, transistor Tr61 will be short-circuited and thyristor SCR61 cannot be turned on.

If the conduction ratio of chopper circuit 3 (i.e., the conduction ratio of thyristor 4) is low, the average voltage supplied to thyristor 4 will be high. On the contrary, the average voltage will be low when the conduction ratio of thyristor 4 is high.

The voltage applied to thyristor 4 is applied to the base of transistor Tr61 through lead 190, resistor R133, Zener diode Z22, resistor R72, diode D69, Zener diode Z62, and diode D73. Therefore, transistor Tr61 will be short-circuited and thyristor SCR61 cannot turn on if the conduction ratio of thyristor 4 is small and the average voltage exceeds the breakdown voltage of Zener diode Z62. On the other hand, transistor Tr61 will be turned off and thyristor SCR61 will turn on when the conduction ratio increases and the average voltage of thyristor 4 falls below the breakdown voltage of Zener diode Z62.

When the above conditions for closure of thyristor 4 are satisfactorily met, transistor Tr61 will turn off and capacitor C62 will begin to charge through lead 170, the diode D64 and resistor R64. Thyristor SCR61 is turned on after the lapse of a specified delay time that is dependent on the time constant of resistor R64 and capacitor C62, and relay 80 is energized so that the by-pass contacts 80a can be closed.

Operation of the major components shown in the checking or detecting circuit 160 is as follows:

Transistor Tr62 is short-circuited when thyristor SCR61 turns on to aid in the discharging of the capacitor C62. Diode D65 causes transistor Tr61 to turn on through the auxiliary contact 80b of relay 80 when relay 80 has been closed, thus causing discharge of capacitor C62.

The voltage of DC power source 1 may fluctuate widely during charging or heavy discharge current. On the other hand, a constant voltage power source is required in order to stabilize the function of ON and OFF oscillators to be described later.

The circuit of FIG. 5 thus includes a constant voltage power circuit comprising a pair of Zener diodes Z81, Z82, a pair of resistors R82, R83, a pair of capacitors C82, C83, and a pair of diodes D81, D82.

The diodes D81 functions to apply reverse bias between the emitter and base of transistor Tr92 when the accelerating pedal 7 is depressed lightly to cut-off transistor Tr92 completely.

Similarly, diode D82 is inserted to cut-off transistor 122 completely (to be described later). The signal generator 110 includes the On oscillator and OFF oscillator. The ON oscillator is used to send gate signals to thyristor 4 to make chopper circuit 3 turn on. Pulses from this oscillator are called ON pulses. As shown in FIG. 5, the ON oscillator includes a pair of transistors Tr124, Tr125, and a pulse transformer T121. On the other hand, the OFF oscillator includes three transistors Tr151, Tr152, Tr153 and a pulse transformer T151.

During starting, the ON oscillator must operate until thyristor 15 turns on. If an ON pulse is generated before thyristor 15 turns on, thyristor 4 will be short-circuited, and thus, transistor 24 is turned on and thyristor 15 is not turned on. For this reason, the main contactor 8a cannot close. To avoid this, the anode of thyristor 15 is connected to the base of transistor Tr123 through lead 41, diode D137 and resistor R144, so that charging of capacitor C121 can be prevented by short-circuiting Tr123 while thyristor 15 is not turned on.

To ensure regular and stabilized chopping, the ON oscillator must function only when thyristor 4 is turned off. In addition, it must begin to oscillate after the commutating capacitor (not shown) has been charged. The anode voltage of thyristor 4 is divided by a resistor 130 and a resistor 131 through resistor R133 and Zener diode Z22, and is applied to the cathode of diode 124. If thyristor 4 is turned on, the anode voltage of thyristor 4 will be low (approximately 1–2 volts) and the ON oscillator cannot function since capacitor C121 discharges through diode D124 and resistor R131.

On the other hand, if thyristor 4 is turned off, the anode voltage will be almost identical with the battery voltage. Therefore, C121 does not discharge and the ON oscillator functions normally. If the ON oscillator should operator during the charging interval of the commutation capacitor (not shown), even while thyristor 4 is turned off, the commutation capacitor cannot charge sufficiently and the so-called commutation failure occurs and chopping cannot be performed. Therefore, the ON oscillator must operate properly after the commutation capacitor has been charged. The anode of thyristor 4 is connected to the base of transistor Tr123 through resistor R145, capacitor C123 and diode D138. Consequently, while the commutation capacitor is charged, capacitor C123 is also charged, and, thus, the On oscillator does not operate since transistor Tr123 is short-circuited by the charging current of capacitor C123.

In addition, the ON oscillator must not operate while by-pass contacts 80a are closed. If motor current is interrupted while thyristor 4 is closed, contact wear will be excessive and contact life will be shortened.

When stopping the vehicle, the ON oscillator must cease functioning after the accelerating switch has been opened. If accelerating switch 6 is opened (ignition switch 5 and manually operated direction switches LSF or LSR can also be used for this purpose) to stop the vehicle, the main contacts 8a will be opened and the vehicle will be stopped. However, the main contacts 8a must not interrupt the chopper circuit.

Thus, chopper circuit 3 must be switched off before the opening of main contacts 8a. The ON oscillator is thus disconnected when accelerating switch 6 has been opened, but the OFF oscillator is allowed to remain functioning. Thus, chopper circuit 3 has already been switched off when the main contacts 8a are opened.

The OFF oscillator is used to send gate signals to chopper circuit 3 to make thyristor 4 turn off. Pulses from this oscillator are called OFF pulses. Like the ON oscillator, the OFF oscillator is comprised of two transistors (Tr151, Tr152) and oscillates at a constant rate, starting at the time the ON oscillator operates, and capacitor C151 discharges through diode D155 and transistor Tr125. The OFF oscillator operates after lapse of time which is dependent on the time constant of capacitor C151 and resistor R154. The OFF oscillator continues to generate pulses until the next oscillation takes place in the ON oscillator. OFF pulses will appear again after the start of the next oscillation of the ON oscillator and this periodical interval is also controlled by the diode D155 and the transistor Tr125.

The relationship between the accelerator pedal angle and the vehicle speed, i.e., the accelerator characteristics, is greatly influenced by the slow-speed adjustment of the vehicle, acceleration, or adjustment of braking force.

The accelerator circuit is comprised of variable resistor 12, first auxiliary resistor 13, second auxiliary resistor 28, transistors Tr92, Tr121, Tr122, etc.

Figure 7:
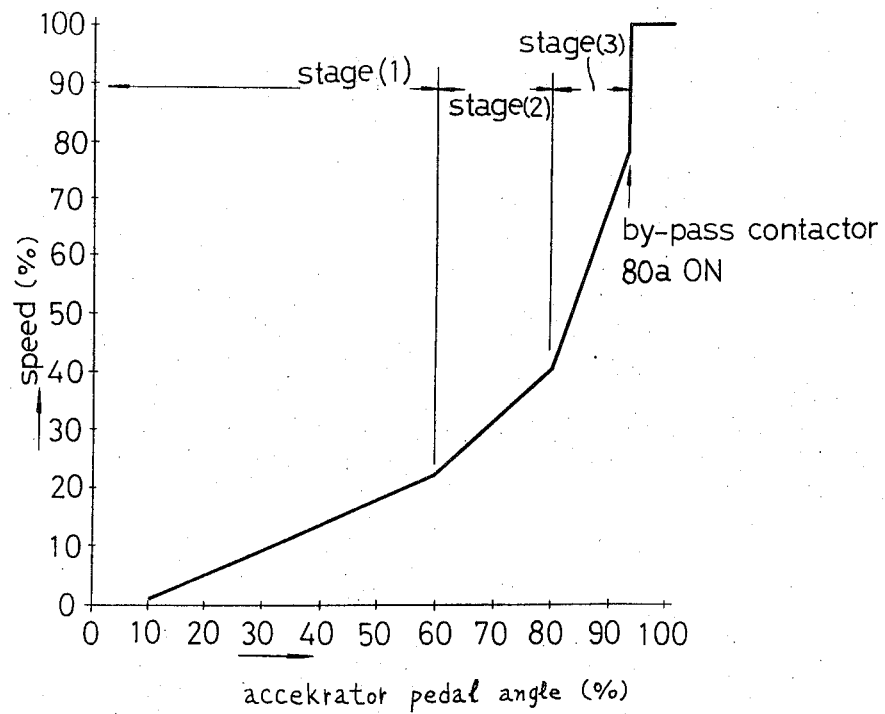
FIG. 7 is a graph depicting the manner in which the speed of a vehicle controlled in accordance with the teachings of this invention varies as a function of the accelerator depression.

As illustrated by the accelerator characteristics shown in FIG. 7, the apparatus has a non-linear relationship between the accelerator pedal angle and the vehicle speed. The characteristic curve is divided into three regions each having different inclinations. Since the inclination is moderate for initial pedal angles, slow vehicle speed can be regulated very smoothly, which is especially important for this type of vehicle.

Since chopper circuit 3 includes a system for controlling the period of two types of pulses (OFF and ON), and the period of the ON oscillator is controlled while that of the OFF oscillator is maintained constant, the accelerator characteristic is dependent on the accelerator pedal position and the period of the ON oscillator.

As mentioned previously, the period of the ON oscillator is determined by the "resistance" R in transistors Tr121, Tr122 and resistors R121 –R127 and the resistor R132. In order to divide the accelerator characteristic into three regions, the "resistance" R must be changed in three ways. This "resistance" R varies with changes in the internal resistance of Tr121 and Tr122, but since Tr121 is connected with resistances R121 and R122, which have a large value, a variation in the internal resistance of Tr121 will cause a variation of 15 percent, more or less, in the "resistance" R. Consequently, "resistance" R will vary almost in proportion to the internal resistance variation in Tr122.

The internal resistance variation in Tr122 caused by a change in the accelerator pedal angle will influence the "resistance" R in the following way: Variable resistor 12 associated with the accelerator pedal has a so-called B characteristic, that is to say the resistance varies in proportion to a variation in the resistor's angle of rotation. Thus, the voltage on the middle terminal of resistor 12 varies almost in proportion to the accelerator pedal angle. According to this variation, the emitter potential of Tr92 and base potential of Tr122 change similarly.

If the accelerator pedal is pressed lightly and the base potential of transistor Tr122 is higher than the potential at a dividing point between resistors R125 and R126, then diodes D121 and D122 can be regarded as non-conducting elements, and so the emitter side of Tr122 will be dependent on resistor R127 and the internal resistance of Tr122. At that time, resistor R127, having a large resistance value, is connected in series with transistor Tr122. Consequently, variations in the "resistance" R are moderate with changes in accelerator pedal angle. This accelerator characteristic corresponds to region (1) of FIG. 7.

If the accelerator pedal is depressed further and the base potential of transistor Tr122 becomes lower than the potential at the dividing point between resistors R125 and R126, then diode D121 will be turned on and the circuit acts as if resistor R125 were connected in parallel with R127. The circuit, in this case, is dependent on resistors R125 - R127 and transistor Tr122. Compared to region (1) of FIG. 7, the emitter resistance at Tr122 is smaller and so internal resistance variations in Tr122 greatly influence the variation in the "resistance" R. This characteristic corresponds to region (2) of FIG. 7.

If the accelerator pedal is depressed further and the base potential of Tr122 becomes lower than the potential at the dividing point between R123 and R124, then Tr122 is also turned on and R123 is inserted in the circuit. Accordingly, internal resistance variation in Tr122 will influence the "resistance" R considerably and the accelerator characteristic corresponds to Region (3).

One skilled in the art may make various changes and substitutions to the circuitry shown without departing from the spirit and scope of the invention set forth in the appended claims.

What is claimed is:

1. An operating system for an electrically driven vehicle of the type wherein power is fed from a DC source to an electric motor, via a chopper circuit, the system comprising:
   a. a relay having an armature and at least one pair of normally open contacts, said contacts being serially connected with said motor, for applying said DC source to said motor;
   b. switching means, serially connected with the armature winding of said relay, the series circuit so formed being connected in parallel with said motor, said switching means including an accelerator switch coupled to the accelerator pedal of said vehicle;
   c. a variable-resistance transducer coupled to said accelerator pedal;
   d. a signal generator, controlled by said variable-resistance transducer, for generating a gating signal for said chopper circuit, in accordance with the instantaneous position of said accelerator pedal;
   e. control circuit means having at least two inputs and an output, said output being connected to said switching means to render same conductive if the signals present on said inputs indicate normal operation of said chopper circuit and said variable-resistance transducer;
   f. an auxiliary resistor connected between said variable-resistance transducer and one side of said DC source, the voltage which is developed across said auxiliary resistor being connected to one of the inputs of said control circuit, the other input thereof being connected to that side of said chopper circuit which connects to said motor; and
   g. means, connected to said switching means, and activated by a drop in the voltage developed across said chopper circuit, for disabling said switching means in the event that a fault occurs in said chopper circuit or said transducer, after said control circuit has rendered said switching means conductive.

2. The system according to claim 1, wherein said switching means includes a thyristor, the output of said control circuit being connected to the gate of said thyristor to gate the same into conduction when operation of said chopper circuit and said variable-resistance transducer are both normal.

3. The system according to claim 2, wherein said control circuit includes:
   an ignition capacitor and a resistor connected in series across the anode and cathode of said thyristor;

a Zener diode connected between the gate of said thyristor and the juncture of said ignition capacitor and resistor; and a transistor, the emitter and collector thereof being connected across said ignition capacitor and the base thereof being connected to said auxiliary resistor and to said chopper circuit, said ignition capacitor being charged by said DC source, through said resistor to break-down said Zener diode and gate said thyristor into conduction if the voltage present on the base of said transistor is such as to maintain said transistor in a non-conductive state.

4. The system according to claim 3, wherein said disabling means comprises:

a silicon-controlled rectifier and a resistor serially connected in parallel across said thyristor;

a capacitor connected between the junction of said resistor and said silicon-controlled rectifier and the anode of said thyristor, said capacitor being charged by said DC source through said resistor and said thyristor when said thyristor is conducting; and means, connected to said chopper circuit, for sensing a malfunction therein, said sensing means rendering said silicon-controlled rectifier conductive to discharge said capacitor in the event of such a malfunction, the negative-going poulse produced by the discharge of said capacitor estinguishing said thyristor, thereby to release said relay and disconnect said motor from the DC source.

5. The system according to claim 4, further comprising:

an "ON" oscillator and an "OFF" oscillator for controlling the conduction angle of said chopper circuit; and means, connected to said thyristor, for disabling said "ON" oscillator after said thyristor is rendered conductive.

6. The system according to claim 5, further comprising:

means, connected to said accelerator pedal, for altering the period of oscillation of said "ON" oscillation in accordance with the angle of depression of said pedal; and means, connected to said "OFF" oscillator, for maintaining the period of oscillation thereof constant.

7. The system according to claim 6, wherein said period adjusting means alters the conduction angle of said chopper circuit, and hence the vehicle speed, with respect to the depression of said accelerator pedal, at at least two different rates, a large initial accelerator depression causing a smaller change in vehicle speed than a subsequent smaller depression.

* * * * *